US006732712B2

(12) United States Patent
Klotz et al.

(10) Patent No.: US 6,732,712 B2
(45) Date of Patent: May 11, 2004

(54) INTERMEDIATE FLANGE SYSTEM FOR AN INTERNAL COMBUSTION ENGINE WITH DIRECT FUEL INJECTION

(75) Inventors: Arthur Klotz, Remseck (DE); Klaus Rentschler, Gaeufelden (DE); Joachim Schraudolf, Heilbronn (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 43 days.

(21) Appl. No.: 10/178,780

(22) Filed: Jun. 25, 2002

(65) Prior Publication Data

US 2003/0015170 A1 Jan. 23, 2003

(30) Foreign Application Priority Data

Jun. 27, 2001 (DE) ........................................ 101 31 110

(51) Int. Cl.[7] ................................................ F02M 55/02
(52) U.S. Cl. .................................. 123/470; 123/184.61
(58) Field of Search ........................... 123/470, 184.61, 123/184.21, 456, 468, 469, 195 A

(56) References Cited

U.S. PATENT DOCUMENTS 4,318,377 A * 3/1982 Occella et al. .............. 123/279
5,163,406 A 11/1992 Daly et al.
5,357,931 A * 10/1994 Semence .................... 123/456
5,465,699 A 11/1995 Voigt
5,482,021 A 1/1996 Roche
6,032,634 A * 3/2000 Minegishi et al. ..... 123/184.55
6,189,503 B1 * 2/2001 Takano ....................... 123/302
6,568,366 B2 * 5/2003 Dietz et al. ................. 123/308

FOREIGN PATENT DOCUMENTS

DE 19920195 11/2000
DE 19946861 4/2001

* cited by examiner

*Primary Examiner*—Mahmoud Gimie
(74) *Attorney, Agent, or Firm*—Crowell & Moring LLP

(57) ABSTRACT

An intermediate flange system for an internal combustion engine with direct fuel injection. The intermediate flange system is mounted between the intake device and the cylinder head and includes two subunits (10, 11). The first subunit includes a basic body (12) and is responsible for conducting the fuel. The other subunit includes a basic body (13) and serves to conduct the intake air. Both basic bodies can be optimally designed as a function of demands to which they are subjected. Thus, basic body (13) is preferably made of synthetic resin material, and basic body (12) of aluminum. Consequently, the overall intermediate flange system is lighter than prior art systems, which heretofore have been made entirely of aluminum.

10 Claims, 3 Drawing Sheets

19 21 30 29 12 13 25 22 12 15a 31 24 23 26 27 32 33 35 34 36 28 27

INTERMEDIATE FLANGE SYSTEM FOR AN INTERNAL COMBUSTION ENGINE WITH DIRECT FUEL INJECTION

BACKGROUND OF THE INVENTION

The invention relates to an intermediate flange system of the type used to conduct the intake air and the fuel in the intake tract of an internal combustion engine with direct fuel injection. The invention further relates to first and second structural assemblies, which can be installed in such an intermediate flange system.

An intermediate flange system of this type is known, for example, from published German patent application no. DE 199 20 195 A1. Such an intermediate flange essentially performs two functions in internal combustion engines with direct fuel injection. The parts needed for these functions can be integrated in the intermediate flange.

On the one hand, the combustion air is conducted from an inlet to an outlet so that the air is guided from an intake duct to the cylinder head of the internal combustion engine. The area of the intermediate flange further comprises a so-called charge movement flap. Depending on the type of installation, the charge movement flap can induce a tumbling or swirling motion in the airflow within the cylinder.

Another important function is to accommodate the fuel line system for direct fuel injection into the cylinders, which is under great pressure, so that the intermediate flange must be designed accordingly. The flange is generally made of metal, e.g., aluminum, while the intake ducts adjoining the openings of the intermediate flange on the intake side can be made of synthetic resin material.

Due to the high stresses resulting from the pressure of the fuel, however, the selection of the material for the intermediate flange system is determined by the specifications for the fuel conduit. The air intake channels for the combustion air do not require the same high strength as the fuel conduit. In this area, the intermediate flange is therefore designed for a multiple of the load that actually occurs based on the internal intake duct pressure. Thus, the component becomes unnecessarily heavy, although it enables the use of a plastic intake duct.

SUMMARY OF THE INVENTION

It is an object of the invention to provide an improved intermediate flange assembly for an internal combustion engine with direct fuel injection.

It is also an object of the invention to provide an intermediate flange system for an internal combustion engine with direct fuel injection, which is both reliable and low-weight.

These and other objects of the invention are achieved by providing an intermediate flange system for an internal combustion engine with direct fuel injection, the flange system having a cylinder head flange with outlets for combustion air for connection to a cylinder head of the internal combustion engine, an interface for connection to an air intake duct with inlets for the combustion air, whereby intake channels are formed between the inlets and the outlets, and a fuel conduit for conducting fuel under pressure, the fuel conduit having a connection opening for connection to a fuel line and having seats for fuel injectors; the intermediate flange system being comprised of first and second subunits assembled together; the first subunit defining the fuel conduit and being made of a first material having sufficient strength to withstand the pressure the fuel is under, and the second subunit forming the intake channels and being made primarily of a second material having a lower strength than the first material.

In accordance with a further aspect of the invention, the objects are achieved by providing an intermediate flange system subunit defining a fuel conduit for conducting fuel under pressure, the fuel conduit having a connection opening for connection to a fuel line and having seats for fuel injectors; wherein the subunit can be assembled with a further subunit defining a plurality of air intake channels to form an intermediate flange system as described above.

In yet another aspect, the objects are achieved by providing an intermediate flange system subunit comprising a cylinder head flange with outlets for combustion air for connection to a cylinder head of an internal combustion engine, and an interface for connection to an air intake duct with inlets for the combustion air; whereby intake channels are formed between the inlets and the outlets; wherein the subunit can be assembled with a further subunit defining a fuel conduit for fuel under pressure to form an intermediate flange system as described above.

The intermediate flange system according to the invention is provided, in known manner, with the above-described system of channels for the combustion air and a conduit for the fuel. It is characterized in that the conduit system for the fuel is accommodated in a first subunit of sufficient strength to withstand the pressure that occurs. The intake channels, on the other hand, are accommodated in a second subunit, which is primarily made of a material of lower strength than that of the first subunit. The two subunits can be joined to form the intermediate flange system and thus result in a compact component, the overall concept of which meets all the requirements of the intermediate flange system. In particular, due to the use of two interlocking subunits, the intermediate flange system has the same geometric dimensions as those found in prior art intermediate flange subunits, which are designed as a single piece and are made of metal. Thus, while keeping the same geometric dimensions, a low-density material can be selected for the second subunit, which is made of a low-strength material, to meet the requirement for a low-weight component that can be produced economically.

The associated internal combustion engine for the intermediate flange is an engine with direct fuel injection, which will allow the savings potential inherent in the invention to be used effectively. Both diesel engines and gasoline engines with direct fuel injection may be used.

According to a further embodiment of the invention, either the air intake channels or the conduit system for the fuel are combined into a first or a second basic body, which together with other functional components then forms the first and second subunit. The intake channels or the conduit system can also be combined in more than one group into two or more corresponding basic bodies. This is useful, for instance, if the internal combustion engine has a V-type or a W-type configuration of the cylinders. In this case, one such a subunit can be formed for each cylinder bank.

In the case of the second subunit, the additional functional components are, for instance, the system of charge movement flaps, the connecting collars made of rubber between the intermediate flange and the intake duct, or the seal in the flange toward the cylinder head. The functional components of the first subunit can be the fuel injectors as well as plugs, which preferably seal the ends of the conduits that are drilled into the structure.

According to a further embodiment of the invention, the first subunit can be predominantly made of metal and the second subunit primarily of synthetic resin material. "Predominantly" is meant to express that the aforementioned functional components can also be made of other materials. The basic bodies, however, are made of the same materials in any case. Pressure die cast aluminum, for instance, may be considered for the first subunit, while glass fiber reinforced polyamide, for example, can be used for the second subunit. With such material selections, the cost and weight advantages afforded by the two-piece construction of the flange system can be optimally utilized.

One advantageous embodiment of the invention further provides that the fastening means, particularly screws, are provided in the first subunit. This is the stronger of the two subunits, so that the intermediate flange system can be fixed to the cylinder head without any further reinforcements. The second subunit is fixed simultaneously when the first subunit is mounted. This may be conceived in such a way that the first subunit surrounds the second one like a bracket to fix the second subunit at the mounting location. The great advantage is that the second subunit, which is made of the less strong material, does not require any additional reinforcements to enable separate mounting. This saves reinforcement sleeves and the like, which would normally be required to fix cylinder head flanges that are made of synthetic resin material.

The fastening means may of course also be guided through the second subunit. For this purpose, bores may be provided, through which the fastening screws are inserted. The fastening screws are supported in the first subunit, however, such that the surface pressure is distributed within the second subunit.

Protection is claimed for the individual first and second subunits to the extent that they are suitable, in interaction with the respective other subunit, to produce the intermediate flange system according to the invention.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
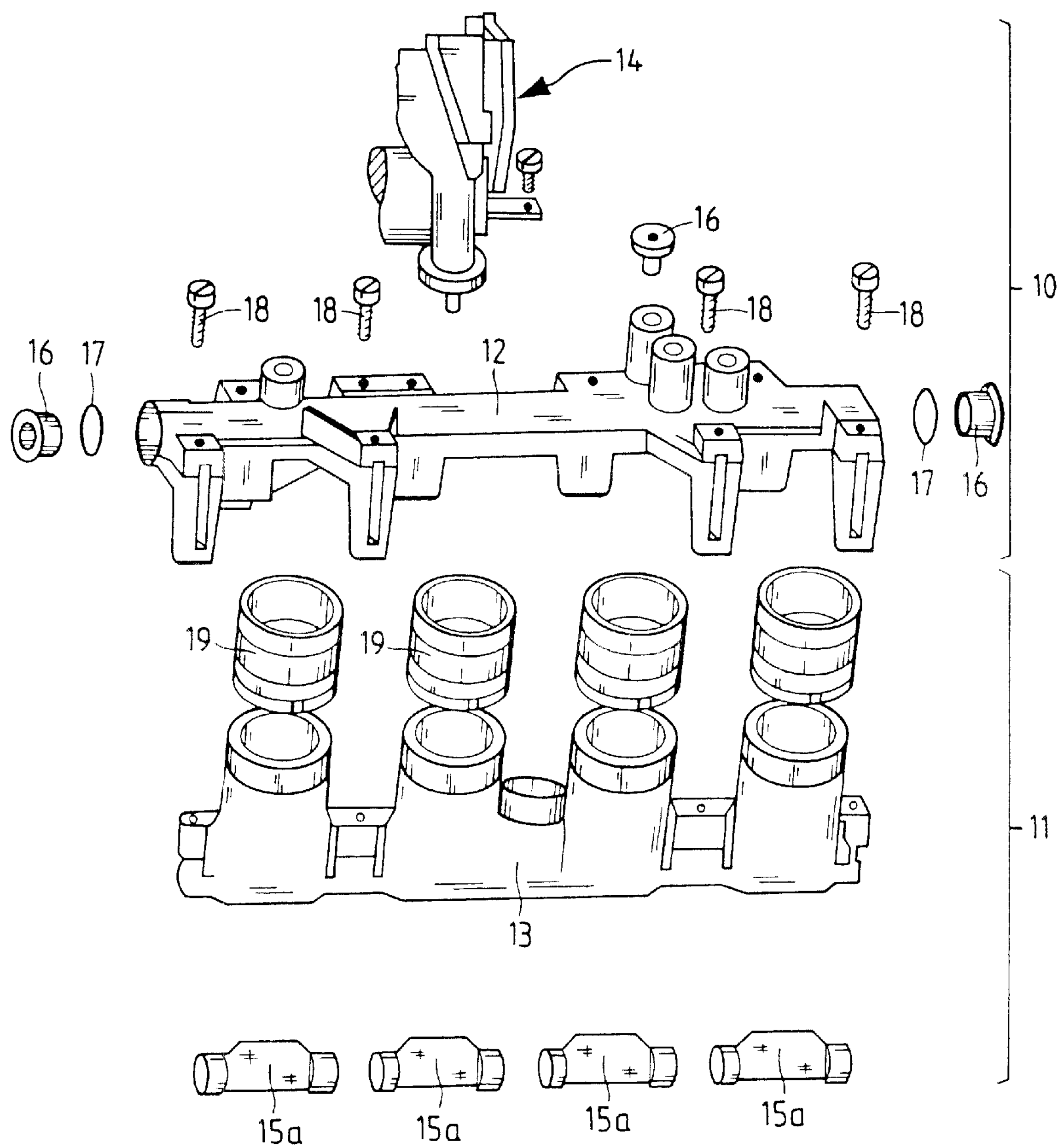
FIG. 1 is a perspective exploded view of the intermediate flange system according to the invention.

The intermediate flange system according to FIG. 1 comprises a first subunit 10 and a second subunit 11. The first subunit is provided with a basic body 12 and the second subunit 11 with a basic body 13. The basic bodies are used for mounting additional functional components. A drive unit 14 is flange-mounted to the first basic body 12 and communicates with the charge movement flaps 15*a* via a shaft (not shown). The drive unit is used for a steplessly variable adjustment of the angle of the charge movement flaps.

Also shown are various plugs 16, which are used to seal the ends of the conduit structures formed in the basic body. Sealing rings 17 are used in addition. The openings to be sealed are formed by producing the first basic body as a pressure die cast aluminum component, since this component requires slide cores for producing the hollow structures, which must be removed from the mold toward the exterior. Finally, the premounted first subunit is mounted by screws 18 to a cylinder head (not shown). It may be seen that the first basic body 12 surrounds the second basic body 13 like a bracket such that the second subunit is fixed simultaneously to the cylinder head.

The second basic body, in addition to the charge movement flaps 15*a*, is also provided with rubber collars 19, which in conjunction with rings (not shown) establish a connection to the intake duct (also not shown).

Figure 2:
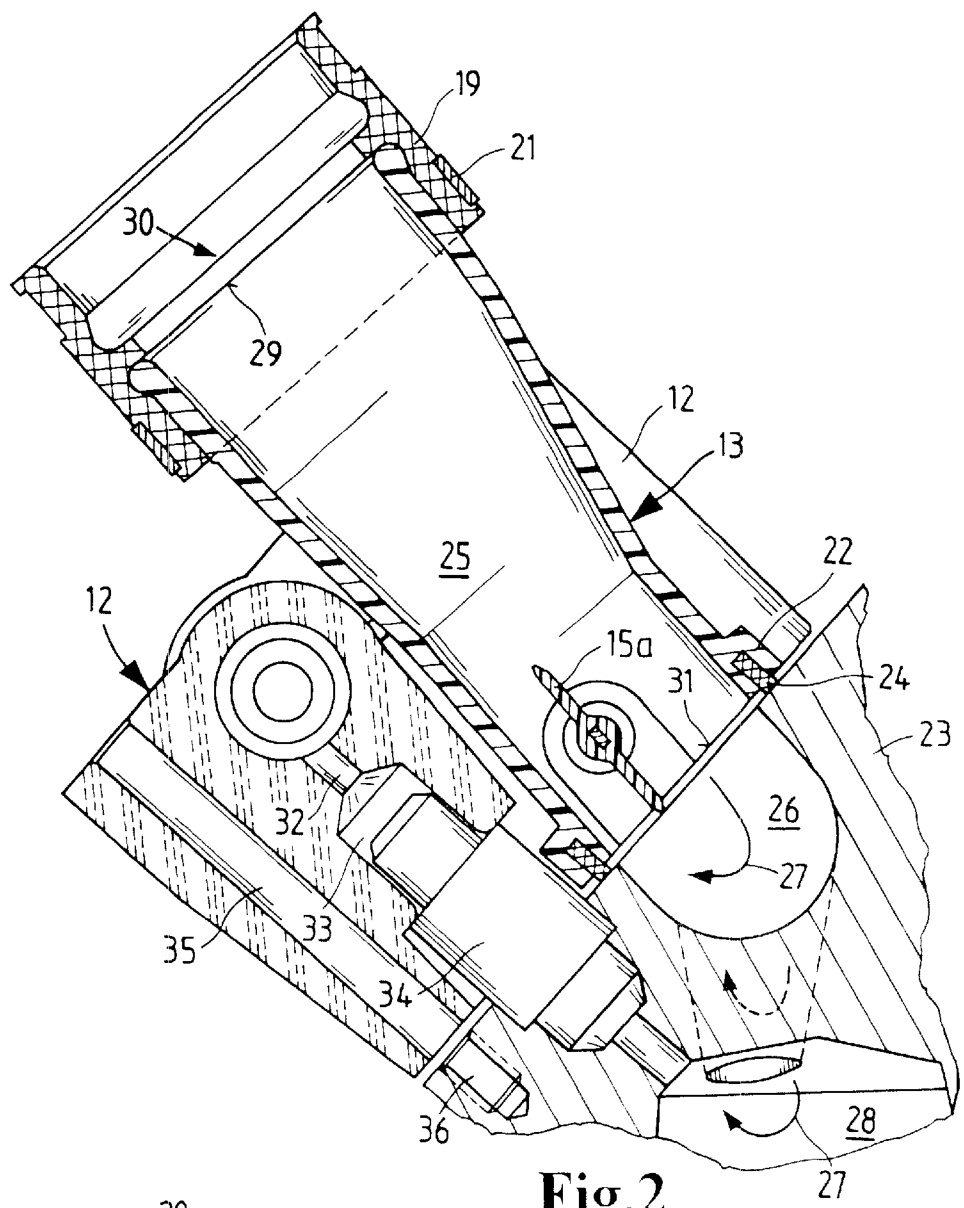
FIG. 2 is a section through the intermediate flange system according to FIG. 1 along one of the intake channels when mounted to the cylinder head.
Figure 3:
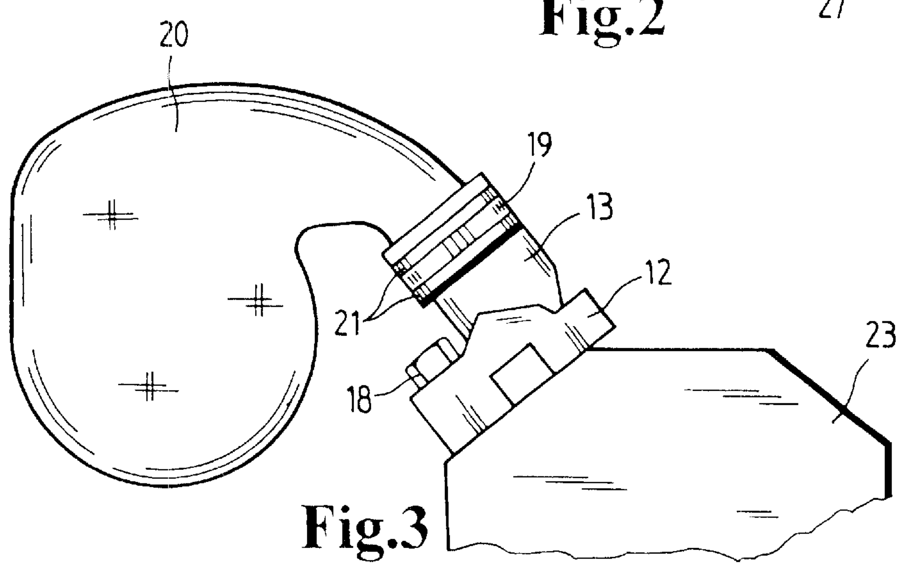
FIG. 3 is a schematic view of a mounted intermediate flange system with internal combustion engine and intake duct.

The mode of action of the mounted intermediate flange system is best seen in FIGS. 2 and 3. FIG. 3 shows the intermediate flange system comprising a first basic body 12 and a second basic body 13. An intake duct 20 is connected to the second basic body 13 by rubber collars 19, as described above. Fastening rings 21, whose exact configuration may also be seen in FIG. 2, are used for this purpose.

With a cylinder head flange 22 (shown in FIG. 2), the second basic body 13 is connected to cylinder head 23 of an internal combustion engine. The cylinder head flange 22 is attached or mounted to the cylinder head 23 by fastening screw 18 through the first basic body 12.

Details of the intermediate flange system mounted to cylinder head 23 are shown in FIG. 2. Between the cylinder head and the second basic body, a molded seal 24 is used, such that the combustion air is guided from an intake channel 25 formed in the second basic body 13 into a feed port 26 made in the cylinder head. The charge movement flap 15*a*, if set at an angle, induces a tumbling motion 27 in the intake air (indicated by the arrows in the feed port), which causes corresponding swirling inside a combustion chamber 28 of the cylinder.

To guide the intake air, intake channel 25 thus forms only an intermediate element between cylinder head 23 and intake duct 20 (cf. FIG. 3). This intake channel 25 thus extends from an inlet 29, which forms an interface 30 with the intake duct, to an outlet 31, which lies in the plane of the cylinder head.

The first basic body 12 forms conduit structures 32, which are provided for the passage of the fuel. These conduit structures open out into seats 33 for fuel injectors 34, which in turn extend into the cylinder head up to combustion chamber 28. FIG. 2 shows a section through one such seat with the corresponding fuel injector; the others lie outside the drawing plane.

Also shown in basic body 12 is a through bore 35, which receives fastening screw 18. The cylinder head is provided with a threaded hole 36 for the screw. The screw itself is not shown in FIG. 2, but may be seen in FIG. 3.

It may also be seen that the basic body 12, outside the area shown in cross section, continues behind intake channel 25 and thus surrounds basic body 13 like a bracket. This also produces the required surface pressure for molded seal 24.

The distinctive features of the second basic body 13 shown in FIG. 4 will now be described in greater detail with reference to FIG. 3. Instead of the charge movement flap 15*a* shown in FIG. 2, the exemplary embodiment depicted in FIG. 4 has a charge movement flap 15*b* arranged at a right angle to the axis of rotation. This flap can be driven by a pulley 37. Rotating the axis of rotation by 90° causes a different charging movement effect, namely a swirl 38, indicated by the solid arrow. The swirl passes through the feed port 26 shown in broken lines and causes vortexing about an axis of rotation that corresponds to the axis of the combustion chamber (not shown). This charging movement also improves mixing of the fuel, which is introduced into the combustion chamber by the fuel injector (see FIG. 2).

Figure 4:
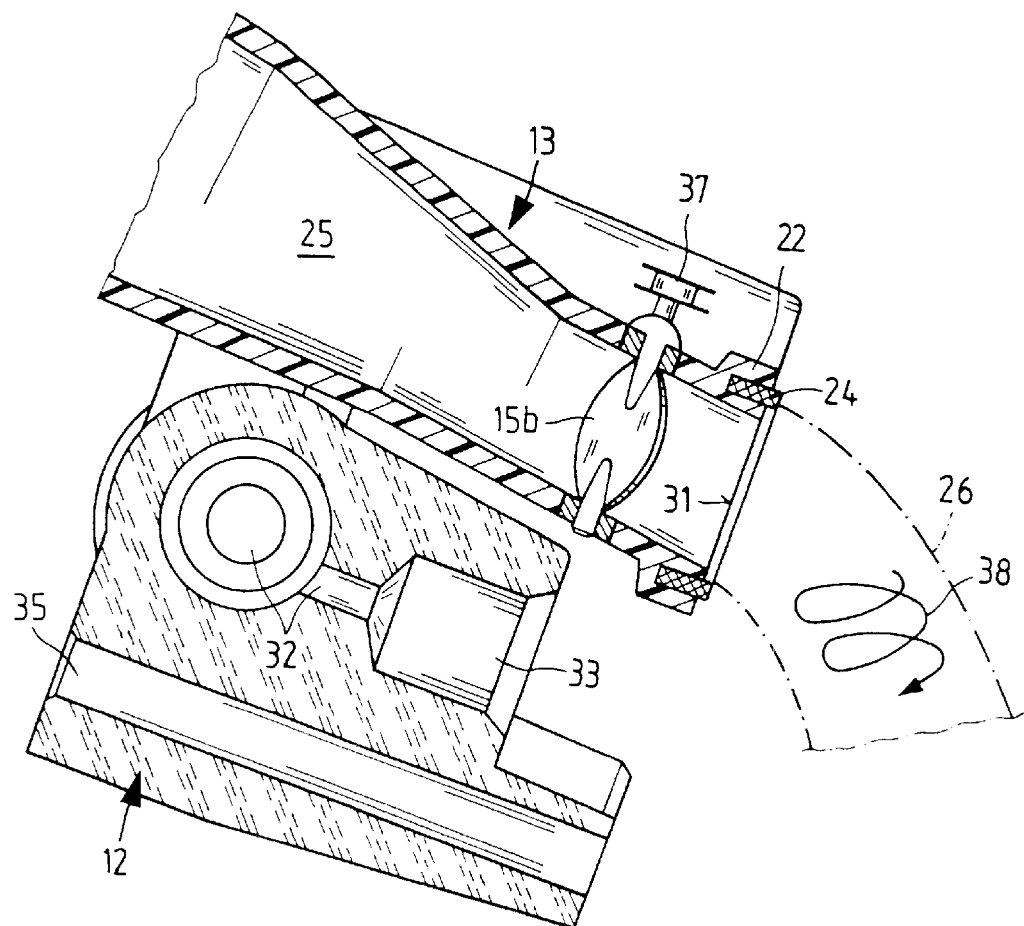
FIG. 4 is a sectional view of an alternative embodiment of an intermediate flange system analogous to FIG. 2.
Figure 5:
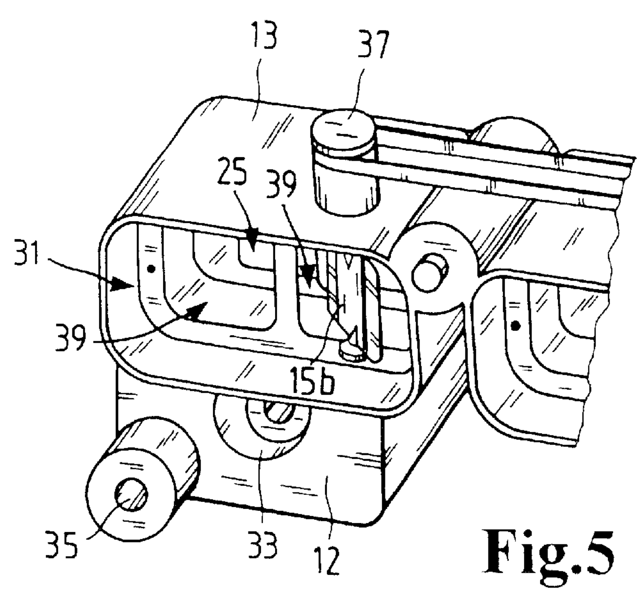
FIG. 5 is a perspective view of a detail of the intermediate flange system according to FIG. 4.

FIG. 5 is a top view onto the outlets 31 of the intermediate flange system according to FIG. 4. This figure illustrates how the pulley 37 drives the charge movement flap 15*b*. The intake channel 25 is divided into two partial channels 39, only one of which is provided with a charge movement flap 15*b*. The first basic body with through bore 35 and seat 33 for the fuel injector may be seen in the lower area of the drawing.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An intermediate flange system for an internal combustion engine with direct fuel injection, said flange system having:

a cylinder head flange with outlets for combustion air for connection to a cylinder head of the internal combustion engine;

an interface for connection to an air intake duct with inlets for the combustion air; whereby intake channels are formed between said inlets and said outlets; and a fuel conduit for conducting fuel under pressure, said fuel conduit having a connection opening for connection to a fuel line and having seats for fuel injectors;

wherein said intermediate flange system is comprised of first and second subunits assembled together;

said first subunit defining said fuel conduit and being made of a first material having sufficient strength to withstand the pressure the fuel is under, and said second subunit forming said intake channels and being made primarily of a second material having a lower strength than said first material.

2. An intermediate flange system according to claim 1, wherein said fuel conduit is combined at least one group into a respective first basic body, said first basic body forming together with additional functional components said first subunit.

3. An intermediate flange system according to claim 1, wherein said intake channels are combined in at least one group into a respective second basic body, said second basic body forming together with additional functional components said second subunit.

4. An intermediate flange system according to claim 1, wherein said first subunit is made predominantly of metal and said second subunit is made predominantly of synthetic resin material.

5. An intermediate flange system according to claim 1, wherein said second subunit comprises charge motion flaps for influencing airflow motion through respective intake channels.

6. An intermediate flange system according to claim 1, said first subunit comprises seats for fasteners for fixing the intermediate flange system to the cylinder head, and said second subunit is held against the cylinder head by said first subunit.

7. An intermediate flange system according to claim 6, wherein the first subunit is made primarily of metal.

8. An intermediate flange system subunit defining a fuel conduit for conducting fuel under pressure, said fuel conduit having a connection opening for connection to a fuel line and having seats for fuel injectors;

wherein said subunit can be assembled with a further subunit defining a plurality of air intake channels to form an intermediate flange system according to claim 1.

9. An intermediate flange system subunit comprising:

a cylinder head flange with outlets for combustion air for connection to a cylinder head of an internal combustion engine; and an interface for connection to an air intake duct with inlets for the combustion air; whereby intake channels are formed between said inlets and said outlets;

wherein said subunit can be assembled with a further subunit defining a fuel conduit for fuel under pressure to form an intermediate flange system according to claim 1.

10. An intermediate flange system according to claim 1, wherein the first subunit is directly attached to the cylinder head by fastners.

* * * * *